US012669761B2

(12) United States Patent
Nawa et al.

(10) Patent No.: US 12,669,761 B2
(45) Date of Patent: Jun. 30, 2026

(54) DRUM CARTRIDGE

(71) Applicant: CANON KABUSHIKI KAISHA, Tokyo (JP)

(72) Inventors: Satoshi Nawa, Chiba (JP); Michihiro Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/898,355

(22) Filed: Sep. 26, 2024

(65) Prior Publication Data

US 2025/0123577 A1 Apr. 17, 2025

(30) Foreign Application Priority Data

Oct. 11, 2023 (JP) ................................ 2023-176336

(51) Int. Cl.
*G03G 15/02* (2006.01)
*G03G 15/00* (2006.01)

(52) U.S. Cl.
CPC ....... *G03G 15/0225* (2013.01); *G03G 15/757* (2013.01)

(58) Field of Classification Search
CPC ............. G03G 15/0225; G03G 15/757; G03G 21/0058
See application file for complete search history.

(56) References Cited

U.S. PATENT DOCUMENTS

2006/0115292 A1* 6/2006 Sampe ............... G03G 15/0225 399/176
2007/0292158 A1* 12/2007 Matsumoto ........ G03G 15/0225 399/176
2009/0067874 A1* 3/2009 Hoshio .............. G03G 15/0225 399/100
2017/0285507 A1* 10/2017 Mitsui ................ G03G 15/0225
2022/0163903 A1 5/2022 Katsumata
2022/0171327 A1* 6/2022 Sakuwa ............. G03G 21/1821

FOREIGN PATENT DOCUMENTS

JP 2005301216 A 10/2005
JP 2008026614 A 2/2008
JP 2013125098 A 6/2013
JP 2014144835 A 8/2014
JP 2015145983 A 8/2015

* cited by examiner

*Primary Examiner* — Sandra Brase
(74) *Attorney, Agent, or Firm* — Canon U.S.A., Inc., IP Division

(57) ABSTRACT

Disclosed is a drum cartridge attachable to an image forming apparatus that includes a casing, a drum shaft bearing, a photosensitive drum rotatably supported by the drum shaft bearing, a charging roller for charging the photosensitive drum, a charging roller bearing, a charging roller urging member, a cleaning roller for cleaning the charging roller, a cleaning roller bearing, and a cleaning roller urging member. The charging roller is regulated in a circumferential direction by the charging roller bearing. The cleaning roller is regulated in a circumferential direction by the charging roller bearing. The charging roller bearing includes a first portion for regulating the cleaning roller bearing, and a second portion for regulating the cleaning roller bearing. The cleaning roller includes a regulation portion for regulating the cleaning roller bearing in a rotation shaft axis direction of the cleaning roller.

6 Claims, 8 Drawing Sheets

DRUM CARTRIDGE

This application claims the benefit of Japanese Patent Application No. 2023-176336, filed Oct. 11, 2023, which is hereby incorporated by reference herein in its entirety.

BACKGROUND

Field

The present disclosure relates to a drum cartridge including a photosensitive drum, a charging roller, and a cleaning roller.

Description of the Related Art

There is known a drum cartridge in which a photosensitive drum, a charging roller for charging the surface of the photosensitive drum, and a cleaning roller for cleaning the surface of the charging roller are integrally formed in a frame as a cartridge to be attachable to and detachable from an image forming apparatus main body. For example, see U.S. Patent Publication No. 2022-0163903 to Katsumata.

In this drum cartridge, the charging roller formed of an electrically conductive material serving as a charging unit is brought into contact with the surface of the photosensitive drum to charge the surface of the photosensitive drum by applying a voltage between the photosensitive drum and the charging roller.

If foreign substances adhere to the surface of the charging roller when the surface of the photosensitive drum is charged by the charging roller, the photosensitive drum cannot be uniformly charged, and a risk of image defects arises. In response, in the drum cartridge, to remove the foreign substances on the surface of the charging roller, the cleaning roller serving as a cleaning unit contacts the charging roller to clean the surface of the charging roller.

In the drum cartridge discussed in Katsumata, a charging roller is rotatably supported at one end and another end of a rotation shaft of the charging roller is respectively held by shaft bearings of the charging roller. In the drum cartridge discussed in Katsumata, a cleaning roller is rotatably supported at one end and another end of a rotation shaft of the cleaning roller is respectively held by shaft bearings of the cleaning roller. In the drum cartridge discussed in Katsumata, a pressurizing spring serving as an urging member is provided between the charging roller bearing and the cleaning roller bearing. The cleaning roller is pressurized to be brought into contact with the surface of the charging roller, with the pressurizing spring urging the cleaning roller in an urging direction.

To uniformly clean the surface of the charging roller along a lengthwise direction of the charging roller, it is necessary to stabilize a pressurizing force when the cleaning roller is brought into contact with the charging roller. On the other hand, in a case where a mechanism for stabilizing the pressurizing force when the cleaning roller is brought into contact with the charging roller is provided, the size of the drum cartridge tends to be large, because the sizes of components (e.g., cleaning roller bearings) included in the drum cartridge become large.

SUMMARY

The present disclosure is directed to a technique for stabilizing a pressurizing force when a cleaning roller is brought into contact with a charging roller, while reducing the size of a drum cartridge including a photosensitive drum, the charging roller, and the cleaning roller.

An aspect of the present disclosure provides a drum cartridge attachable to and detachable from an image forming apparatus, with the drum cartridge including a casing; a drum shaft bearing configured to be fixedly attached to the casing; a photosensitive drum configured to be rotatably supported by the drum shaft bearing; a charging roller configured to contact a surface of the photosensitive drum, and to charge the photosensitive drum; a charging roller bearing configured to be attached to the casing, and configured to be movable in a radial direction of the photosensitive drum; a charging roller urging member configured to be compressed in the radial direction, wherein one end of which is configured to contact the casing and another end of which is configured to contact the charging roller bearing; a cleaning roller configured to contact a surface of the charging roller, to clean the charging roller; a cleaning roller bearing provided on an end of the cleaning roller to support a rotation shaft of the cleaning roller; and a cleaning roller urging member configured to be compressed in a radial direction of the charging roller, and to contact the charging roller bearing and the cleaning roller bearing. Motion of the charging roller is regulated in a circumferential direction thereof by the charging roller bearing, and the charging roller contacts the photosensitive drum and the charging roller bearing in the radial direction thereof. The circumferential movement of the cleaning roller is regulated by the charging roller bearing, and the cleaning roller contacts the charging roller in a radial direction thereof. The charging roller bearing includes a first portion configured to regulate movement of the cleaning roller bearing in the circumferential direction of the charging roller, and a second portion configured to regulate movement of the cleaning roller bearing in a rotation shaft axis direction of the charging roller. The cleaning roller includes a regulation portion configured to regulate movement of the cleaning roller bearing in a rotation shaft axis direction of the cleaning roller.

Another aspect of the present disclosure provides a drum cartridge attachable to and detachable from an image forming apparatus, with the drum cartridge including a casing; a drum shaft bearing configured to be fixedly attached to the casing; a photosensitive drum configured to be rotatably supported by the drum shaft bearing; a charging roller configured to contact a surface of the photosensitive drum, and to charge the photosensitive drum; a charging roller bearing configured to be attached to the casing, and configured to be movable in a radial direction of the photosensitive drum; a charging roller urging member configured to be compressed in the radial direction, wherein one end of which is configured to contact the casing and another end of which is configured to contact the charging roller bearing; a cleaning roller configured to contact at least a part of a surface of the charging roller, to clean the charging roller; a cleaning roller bearing provided on an end of the cleaning roller to hold a rotation shaft of the cleaning roller; and a cleaning roller urging member configured to be compressed in a radial direction of the charging roller, and to contact the charging roller bearing and the cleaning roller bearing. Motion of the charging roller is regulated in a circumferential direction thereof by the charging roller bearing, and the charging roller contacts the photosensitive drum and the charging roller bearing in the radial direction thereof. Circumferential movement of the cleaning roller is regulated by the charging roller bearing, and the cleaning roller contacts the charging roller in a radial direction of the cleaning roller.

The charging roller bearing includes a first portion configured to regulate movement of the cleaning roller bearing in the circumferential direction of the charging roller, and a second portion configured to regulate the cleaning roller bearing in a rotation shaft axis direction of the charging roller. The casing includes a regulation portion configured to regulate movement of the cleaning roller bearing in a rotation shaft axis direction of the cleaning roller.

Further features of the present disclosure will become apparent from the following description of exemplary embodiments with reference to the attached drawings.

DESCRIPTION OF THE EMBODIMENTS

Exemplary embodiments will be described in detail with reference to the attached drawings. The following exemplary embodiments are not intended to limit the disclosure related to the range of the claims, and all the combinations of features described in the following exemplary embodiments are not necessarily essential for the solution of the present disclosure. The present disclosure can be applied to various kinds of uses such as printers, various kinds of printing machines, copying machines, facsimile machines, and multifunction peripherals.

In a first exemplary embodiment, a rotation shaft axis direction of an electrophotographic photosensitive drum may be referred to as a lengthwise direction. In the lengthwise direction, a side on which the electrophotographic photosensitive drum receives a driving force from an image forming apparatus main body may be referred to as a drive side, and the opposite side of the drive side may be referred to as a non-drive side.

<Configuration of Image Forming Apparatus>

Figure 1:
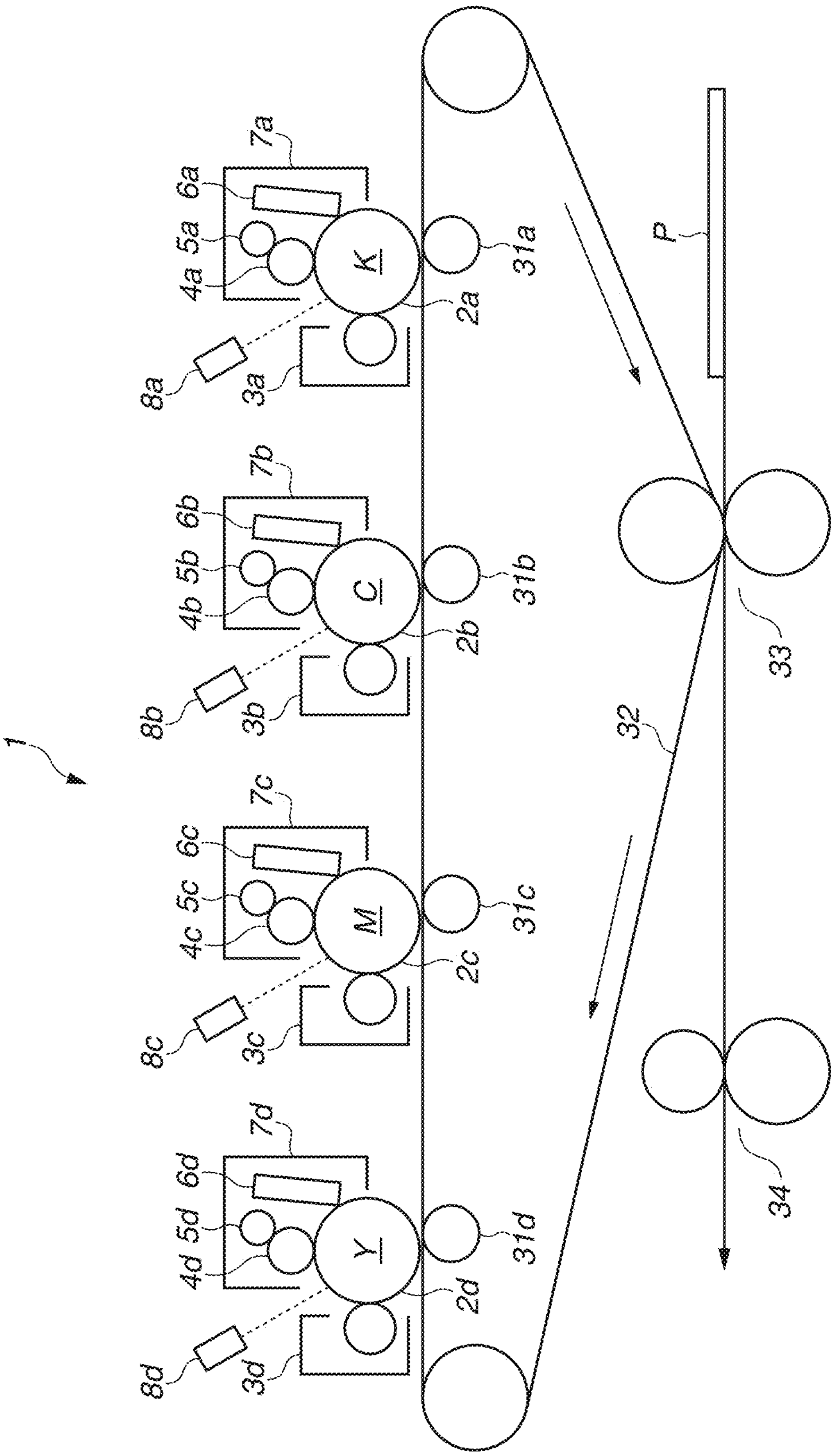
FIG. 1 is a cross-section diagram illustrating a configuration of an image forming apparatus according to a first exemplary embodiment.

An overall configuration and an image forming process of an image forming apparatus according to the first exemplary embodiment will be described with reference to a cross-section diagram in FIG. 1.

An image forming apparatus 1 is an intermediate transfer belt type color digital printer including four drum cartridges 7 (7*a*, 7*b*, 7*c*, and 7*d*) attachable to and detachable from the main body of the image forming apparatus 1 along an intermediate transfer belt 32.

The surfaces of four photosensitive drums 2 (2*a*, 2*b*, 2*c*, and 2*d*) are uniformly charged by charging rollers 4 (4*a*, 4*b*, 4*c*, and 4*d*), respectively.

The charging rollers 4 may become unable to uniformly charge the photosensitive drums 2 as dirt, floating toner particles, or the like contaminate the charging rollers 4. For this reason, the surfaces of the charging rollers 4 (4*a*, 4*b*, 4*c*, and 4*d*) are cleaned to reduce the contamination by the cleaning rollers 5 (5*a*, 5*b*, 5*c*, and 5*d*) respectively arranged to face the charging rollers 4 (4*a*, 4*b*, 4*c*, and 4*d*).

Yellow, magenta, cyan, black image signals are input to laser scanners 8 (8*a*, 8*b*, 8*c*, and 8*d*), and the surfaces of the photosensitive drums 2 (2*a*, 2*b*, 2*c*, and 2*d*) are irradiated with laser beams corresponding to the input signals to form latent images by neutralizing the charges, respectively.

The latent images formed on the photosensitive drums 2 (2*a*, 2*b*, 2*c*, and 2*d*) are developed by developing devices 3 (3*a*, 3*b*, 3*c*, and 3*d*) with yellow, magenta, cyan, and black toners, respectively.

The toner images developed on the photosensitive drums 2 (2*a*, 2*b*, 2*c*, and 2*d*) are primarily transferred sequentially on the intermediate transfer belt 32 by primary transfer rollers 31 (31*a*, 31*b*, 31*c*, and 31*d*) to form a full color toner image on the surface of the intermediate transfer belt 32. The transfer residual toners on the photosensitive drums 2 (2*a*, 2*b*, 2*c*, and 2*d*) are respectively collected by drum cleaners 6 (6*a*, 6*b*, 6*c*, and 6*d*), and conveyed to a toner collection container.

A transferred medium P, such as a paper sheet that is fed from a paper feed unit, is conveyed to a secondary transfer portion 33 in synchronization with the toner image on the intermediate transfer belt 32. The toner image on the intermediate transfer belt 32 is transferred onto the transferred medium P at the secondary transfer portion 33, and the transferred medium P with the toner image transferred thereon is conveyed to a fixing portion 34. Then, after the toner image on the transferred medium P conveyed to the fixing portion 34 is fixed on the transferred medium P at the fixing portion 34 by applying heat and pressure, the transferred medium P is discharged outside the image forming apparatus 1.

<Configuration of Drum Cartridge>

With reference to FIGS. 2 to 5, configurations of the drum cartridges 7 (7*a*, 7*b*, 7*c*, and 7*d*) according to the first exemplary embodiment will be described. Note that the configurations of the drum cartridges 7 (7*a*, 7*b*, 7*c*, and 7*d*) and their related units are similar to each other. Thus, one of the drum cartridges 7 (7*a*, 7*b*, 7*c*, and 7*d*) and the related units are described as being representative of them, without adding suffixes a, b, c, and d to the numerals.

Figure 2:
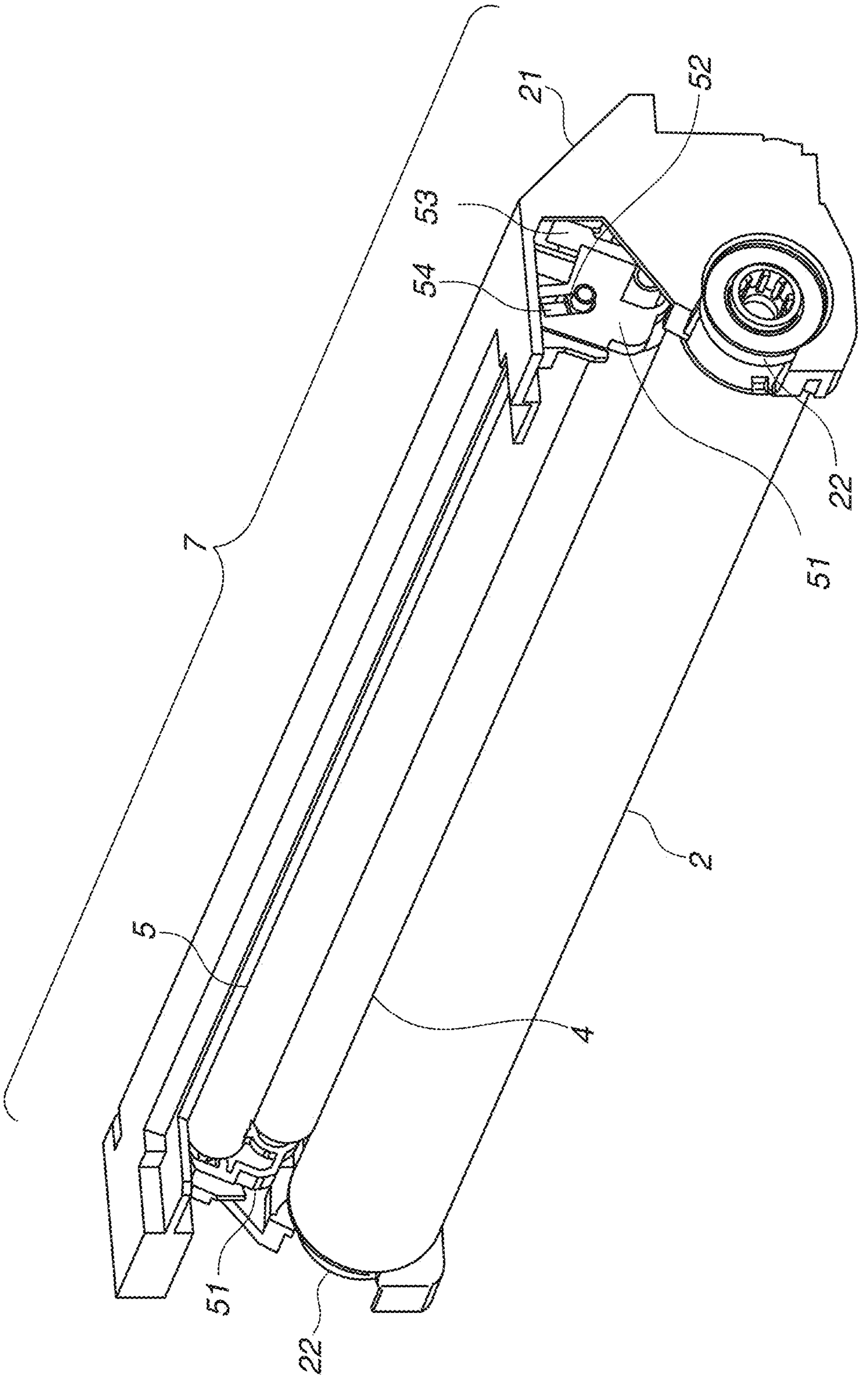
FIG. 2 is a perspective view illustrating a configuration of a drum cartridge according to the first exemplary embodiment.

FIG. 2 is a perspective view illustrating a configuration of the drum cartridge 7 according to the first exemplary embodiment.

The drum cartridge 7 includes the photosensitive drum 2, the charging roller 4, and the cleaning roller 5.

The drum cartridge 7 is arranged to be attachable to and detachable from the main body of the image forming apparatus 1, and attached to a drum container 21 serving as a casing at both ends of the drum container 21 in the lengthwise direction.

On opposite ends in the lengthwise direction of the photosensitive drum 2, drum shaft bearings 22 are respectively arranged. A rotation shaft of the photosensitive drum 2 is held by the two drum shaft bearings 22 to rotatably support the photosensitive drum 2. The photosensitive drum 2 is driven to rotate when the photosensitive drum 2 receives a driving force from a driving unit arranged at a rear side of the main body of the image forming apparatus 1 in a state where the rotation shaft of the photosensitive drum 2 is held by the two drum shaft bearings 22.

The charging roller 4 is disposed to face the photosensitive drum 2, and rotated by being pressed by the photosensitive drum 2. The charging roller 4 applies uniform charge on the surface of the photosensitive drum 2 by a high voltage being applied to the charging roller 4.

Charging roller bearings 51 are respectively disposed at one end and the other end of the charging roller 4 in the lengthwise direction. The rotation shaft of the charging roller 4 is held by the two charging roller bearings 51 so as to rotatably support the charging roller 4.

Charging roller urging members 53 are respectively disposed on one end and the other end of the drum container 21 in the lengthwise direction. The charging roller urging members 53 are attached to the respective charging roller bearings 51. The charging roller urging member 53 presses each of the charging roller bearings 51 to urge the charging roller 4 held by the charging roller bearings 51 towards the photosensitive drum 2.

Both the charging roller bearings 51 and the charging roller urging members 53 may be made of electrically conductive materials.

Accordingly, it is possible to apply a high voltage to the charging roller 4 by electrically connecting a main body power feeding unit and the charging roller urging members 53.

Cleaning roller bearings 52 are respectively disposed on one end and the other end of the cleaning roller 5 in the lengthwise direction. The rotation shaft of the cleaning roller 5 is held by the two cleaning roller bearings 52 to rotatably support the cleaning roller 5.

Charging roller urging members 54 are respectively arranged on the one end and the other end of the drum container 21 in the lengthwise direction. The cleaning roller urging members 54 are attached to the respective cleaning roller bearings 52. The cleaning roller urging members 54 respectively press the cleaning roller bearings 52 to urge the cleaning roller 5 held by the cleaning roller bearings 52 to the charging roller 4. In this way, the cleaning roller 5 is driven to rotate by the charging roller 4, and removes toner adhering to the charging roller 4 to reduce the contamination on the surface of the charging roller 4.

Figure 3:
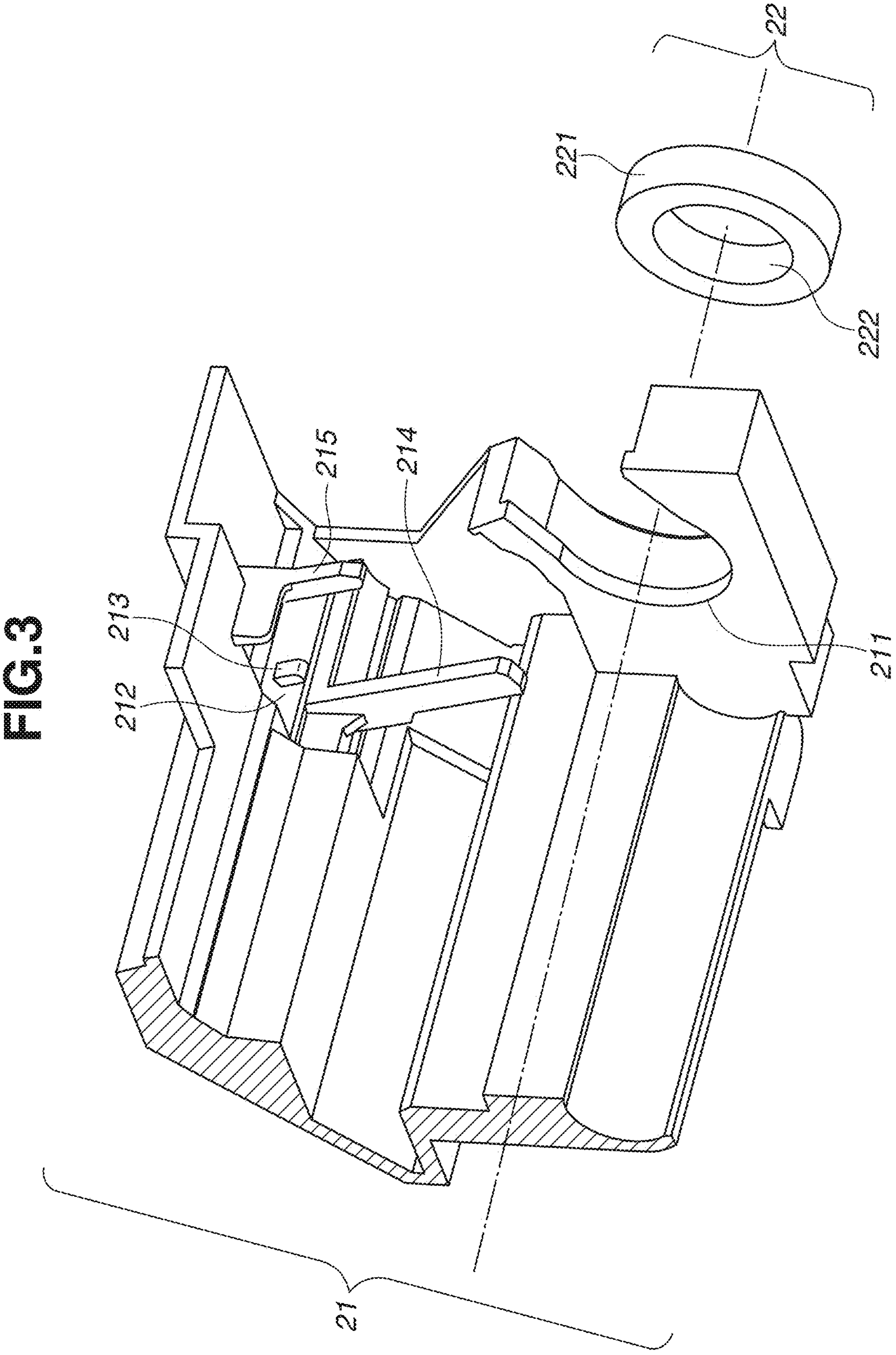
FIG. 3 is a cross-section diagram providing an exploded perspective view of a drum container and a drum shaft bearing according to the first exemplary embodiment.

FIG. 3 is a cross-section diagram providing an exploded perspective view of one of the drum containers 21 and one of the drum shaft bearings 22 according to the first exemplary embodiment. As illustrated in FIG. 3, the drum container 21 is made of a resin material, and the one end and the other end of the drum container 21 in the lengthwise direction are respectively provided with C-shape holes 211. Inside the drum container 21, a first guide portion 214 and a second guide portion 215 arranged to face the first guide portion 214 for each of the C-shape holes 211 in the lengthwise direction are provided. Between the first guide portion 214 and the second guide portion 215, a first contact surface 212 and a first protruding portion 213 are provided.

The drum shaft bearing 22 has an outer periphery portion 221 and an inner periphery portion 222.

Figure 4:
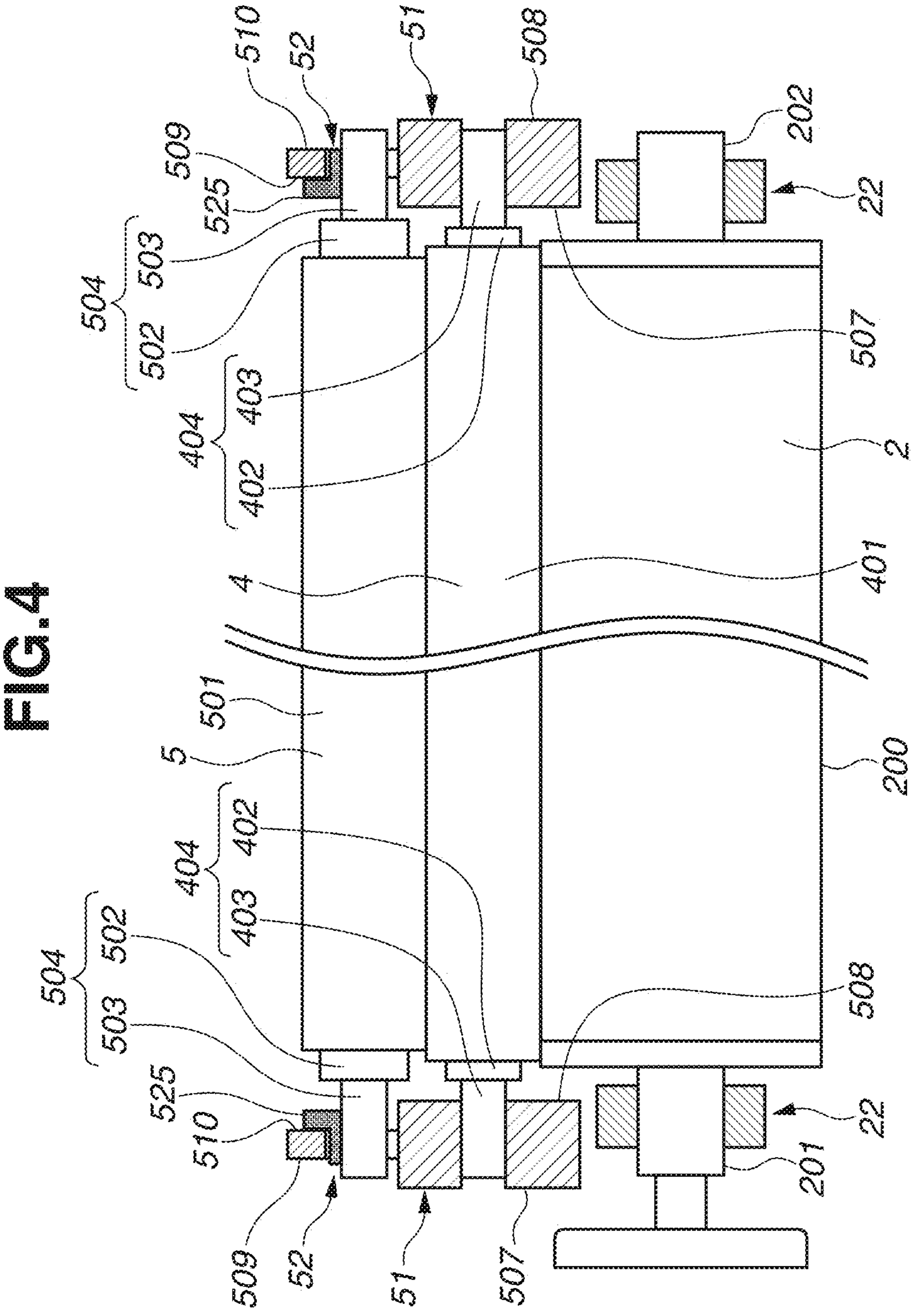
FIG. 4 is a cross-section diagram illustrating a configuration of the drum cartridge in a lengthwise direction according to the first exemplary embodiment.

FIG. 4 is a cross-section diagram illustrating a configuration of the drum cartridge 7 according to the first exemplary embodiment. As illustrated in FIG. 4, the photosensitive drum 2 is formed of a cylindrical portion 200 made of an aluminum material, and a drive-side flange 201 and a non-drive-side flange 202 provided on respective ends of the photosensitive drum 2 in the lengthwise direction.

The charging roller 4 is formed of a rubber portion 401 made of a conductive material, and a first core metal portion 404. Each end of the first core metal portion 404 has two diameter portions, i.e., a first large-diameter portion 402, and a first small-diameter portion 403 that is smaller than the first large-diameter portion 402 in diameter.

The cleaning roller 5 is formed of a sponge portion 501 made of a sponge material such as urethane, and a second core metal portion 504. Each end of the second core metal portion 504 has two diameter portions, i.e., a second large-diameter portion 502, and a second small-diameter portion 503 that is smaller than the second large-diameter portion 502 in diameter.

The charging roller bearings 51 are made of a conductive resin material, and are respectively provided on the one end and the other end, which is a drive side and a non-drive side, of the drum container 21 in the lengthwise direction. The cleaning roller bearings 52 are respectively provided on the charging roller bearings 51.

Figure 5A:
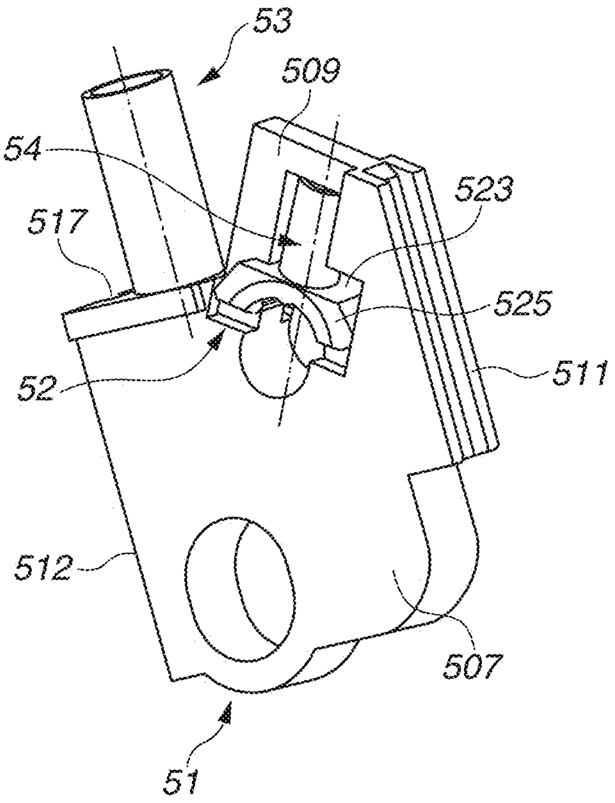
FIGS. 5A and 5B are perspective views illustrating configurations of a charging roller bearing and a cleaning roller bearing according to the first exemplary embodiment.
Figure 5B:
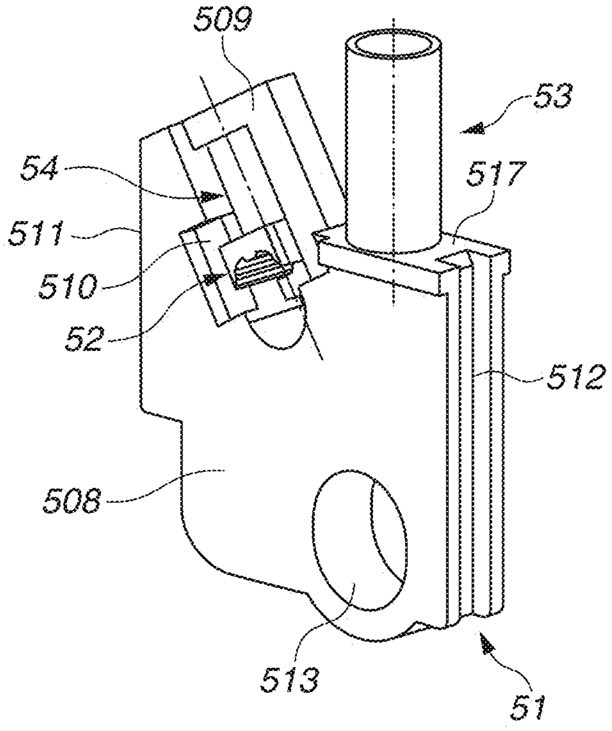
Figure 6A:
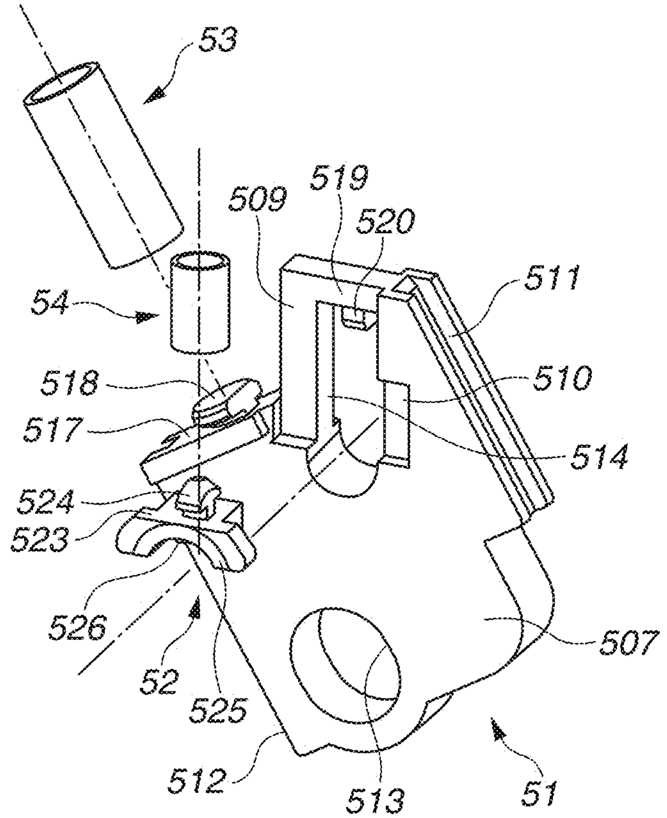
FIGS. 6A and 6B provide exploded perspective views illustrating configurations of the charging roller bearing and the cleaning roller bearing according to the first exemplary embodiment.
Figure 6B:
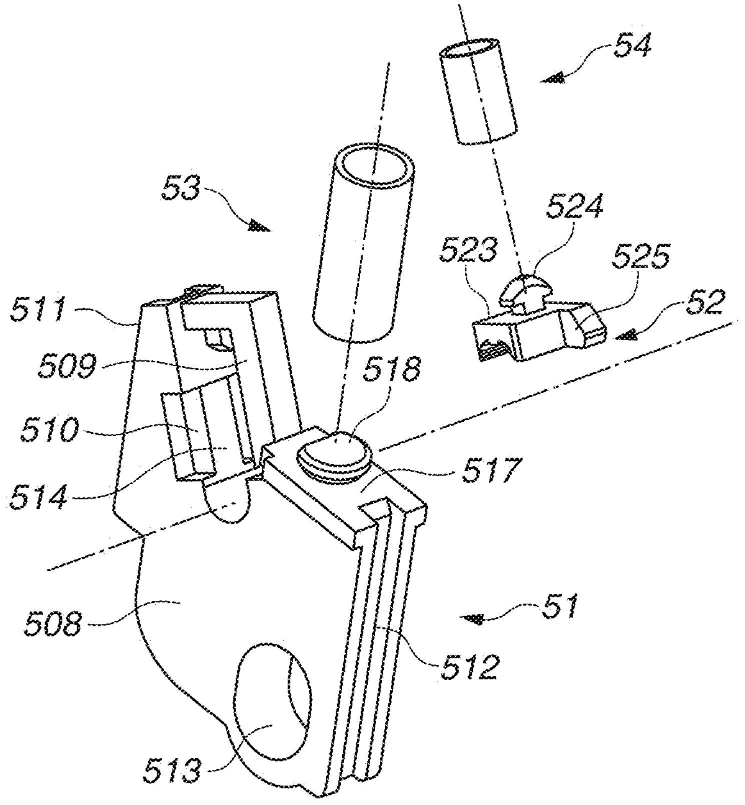

FIG. 5A is a perspective view illustrating a configuration around the charging roller bearing 51, and FIG. 5B is a perspective view from a reverse side of the configuration in FIG. 5A. FIG. 6A provides an exploded perspective view illustrating the configuration around the charging roller bearing 51, and FIG. 6B provides an exploded perspective view from a reverse side of the configuration in FIG. 6A.

As illustrated in FIGS. 5A, 5B, 6A, and 6B, the charging roller bearing 51 includes a second contact surface 517, a second protruding portion 518, a second side surface portion 508, a third side surface portion 509, and a fourth side surface portion 510. The charging roller bearing 51 also includes a first support portion 513 with an elongate-hole shape, a first guide groove 511, a second guide groove 512, a third contact surface 519, and a third protruding portion 520.

The second side surface portion 508 is located at a position opposing a first side surface portion 507 in the lengthwise direction. The third side surface portion 509 is located in a direction in which the thickness of the charging roller bearing 51 is thinner than that of the first side surface portion 507. The fourth side surface portion 510 is located in a direction in which the thickness of the charging roller bearing 51 is thinner than that of the second side surface portion 508.

The cleaning roller bearing 52 is made of a resin material, and includes a fourth contact surface 523, a fourth protruding portion 524, a third guide portion 525, and a pressing portion 526.

The charging roller urging member 53 and the cleaning roller urging member 54 are coiled compression springs made of a material such as a stainless steel wire and a hard steel wire.

A positioning method of the above-described components included in the drum cartridge 7 will be described.

As illustrated in FIG. 3, the C-shape hole 211 of the drum container 21 and the outer periphery portion 221 of the drum shaft bearing 22 fit together, to fix the drum shaft bearing 22 to the drum container 21.

The drive-side flange 201 of the photosensitive drum 2 and the non-drive-side flange 202 are respectively supported by the inner periphery portions 222 of the drum shaft bearings 22, so that the photosensitive drum 2 is rotatably supported by the drum shaft bearings 22.

As illustrated in FIGS. 5A, 5B, 6A, and 6B, the first guide groove 511 of the charging roller bearing 51 engages with the first guide portion 214 provided in the drum container 21. The second guide groove 512 of the charging roller bearing 51 engages with the second guide portion 215 of the drum container 21. In this way, the position of the charging roller bearing 51 is regulated in the lengthwise direction and in a circumferential direction, and is movable in a radial direction of the photosensitive drum 2.

As illustrated in FIGS. 5A, 5B, 6A, and 6B, the first protruding portion 213 provided on the drum container 21 and the inner periphery portion of the charging roller urging member 53 fit together, and the second protruding portion 518 of the charging roller bearing 51 and the inner periphery portion of the charging roller urging member 53 fit together. In this way, the charging roller urging member 53 is regulated in the lengthwise direction and a radial direction, is compressed by the first contact surface 212 of the drum container 21 and the second contact surface 517 of the charging roller bearing 51, so that the charging roller bearing 51 can be pressed toward the photosensitive drum 2.

The first small-diameter portion 403 of the charging roller 4 and the first support portion 513 of the charging roller bearing 51 engage with each other, so that the one end and the other end of the charging roller 4 in the lengthwise direction are supported and rotatably pressed to the photosensitive drum 2.

The first large-diameter portions 402 of the charging roller 4 are regulated by the first side surface portion 507 of the charging roller bearing 51 on the non-drive side, and the second side surface portion 508 of the charging roller bearing 51 on the drive side, which are arranged on both side of the drum container 21, so that the position of the charging roller 4 is regulated in the lengthwise direction.

Second support portions 514 of the charging roller bearings 51 arranged on the drive side and the non-drive side of the drum container 21 respectively engage with the second small-diameter portions 503 of the cleaning roller 5, so that the cleaning roller 5 is regulated in a circumferential direction and movable in a radial direction.

The second large-diameter portions 502 of the cleaning roller 5 are regulated by the first side surface portion 507 of the charging roller bearing 51 on the non-drive side of the drum container 21 in the lengthwise direction, and the second side surface portion 508 of the charging roller bearing 51 on the drive side of the drum container 21, which are arranged on respective ends of the drum container 21. In this way, the position of the cleaning roller 5 is regulated in the lengthwise direction.

The third protruding portion 520 provided on the charging roller bearing 51 is inserted into the inner periphery portion of the cleaning roller urging member 54, so that the fourth protruding portion 524 of the cleaning roller bearing 52 and the inner periphery portion fit together. In this way, the cleaning roller urging member 54 is regulated in the lengthwise direction and a radial direction.

Spaces may be provided respectively between the inner periphery portion of the cleaning roller urging member 54 and the third protruding portion 520, and between the inner periphery portion of the cleaning roller urging member 54 and the outer periphery portion of the fourth protruding portion 524. On the other hand, it is possible to make the cleaning roller bearings 52 difficult to drop in the middle of the assembling, by setting the outer diameter of the third protruding portion 520 or the fourth protruding portion 524 to be larger than the inner diameter of the cleaning roller urging member 54.

The third contact surface 519 of the charging roller bearing 51 and the fourth contact surface 523 of the cleaning roller bearing 52 compress the cleaning roller urging member 54, to press the cleaning roller 5 to the charging roller 4 via the cleaning roller bearing 52. The two guide grooves (first and second guide grooves 511 and 512) of the cleaning roller bearing 52 engage with the two guide portions (first and second guide portions 214 and 215) of the charging roller bearing 51. With this configuration, the position of the cleaning roller bearing 52 is regulated in the lengthwise direction and a circumferential direction, and is movable in a radial direction.

The third guide portion 525 of the cleaning roller bearing 52 is arranged between the third side surface portion 509 of the charging roller bearing 51 arranged on the non-drive side, and the second large-diameter portion 502 of the cleaning roller 5. The third guide portion 525 of the cleaning roller bearing 52 is arranged between the fourth side surface portion 510 of the charging roller bearing 51 arranged on the drive side, and the second large-diameter portion 502 of the cleaning roller 5. In this way, the positions of the cleaning roller bearings 52 are regulated in the lengthwise direction.

The charging roller 4 or the cleaning roller 5 may sometimes move to the drive side or non-drive side at a time of rotation operation, caused by the thrust force generated due to the parallelism between the rotation shaft of the photosensitive drum 2 and the rotation shaft of the charging roller 4 or the rotation shaft of the cleaning roller 5.

For this reason, one of the third guide portions 525 arranged at two positions in the lengthwise direction is arranged closer to the third side surface portion 509 than to the first side surface portion 507. The other third guide portion 525 of the third guide portions 525 arranged at the two positions in the lengthwise direction is arranged closer to the third side surface portion 509 than to the fourth side surface portion 510.

The third guide portions 525 are arranged in this way, so that the third guide portions 525 do not receive the thrust force of the cleaning roller 5. As a result, the sizes of the cleaning roller bearings 52 can be reduced.

According to the first exemplary embodiment described above, it is possible to stabilize the pressurizing force when the cleaning roller 5 is brought into contact with the charging roller 4, while reducing the size of the drum cartridge 7 including the photosensitive drum 2, the charging roller 4, and the cleaning roller 5.

A basic configuration of a drum cartridge according to a second exemplary embodiment is the same as that of the drum cartridge 7 according to the first exemplary embodiment. With the drum cartridge according to the second exemplary embodiment, components having functions or configurations the same as or similar to those of the drum cartridge 7 according to the first exemplary embodiment are assigned the same symbols as those of the first exemplary embodiment, and detailed descriptions thereof are omitted.

In the second exemplary embodiment, a configuration of the drum container is different from that in the first exemplary embodiment. Thus, configurations of a drum container and a drum shaft bearing according to the second exemplary embodiment will be described with reference to the exploded perspective view provided in FIG. 7. In the second exemplary embodiment, the drum container is assigned a symbol different from that in the first exemplary embodiment (see FIG. 7). FIG. 8 is a cross-section diagram illustrating a configuration of a drum cartridge in the lengthwise direction according to the second exemplary embodiment.

Figure 7:
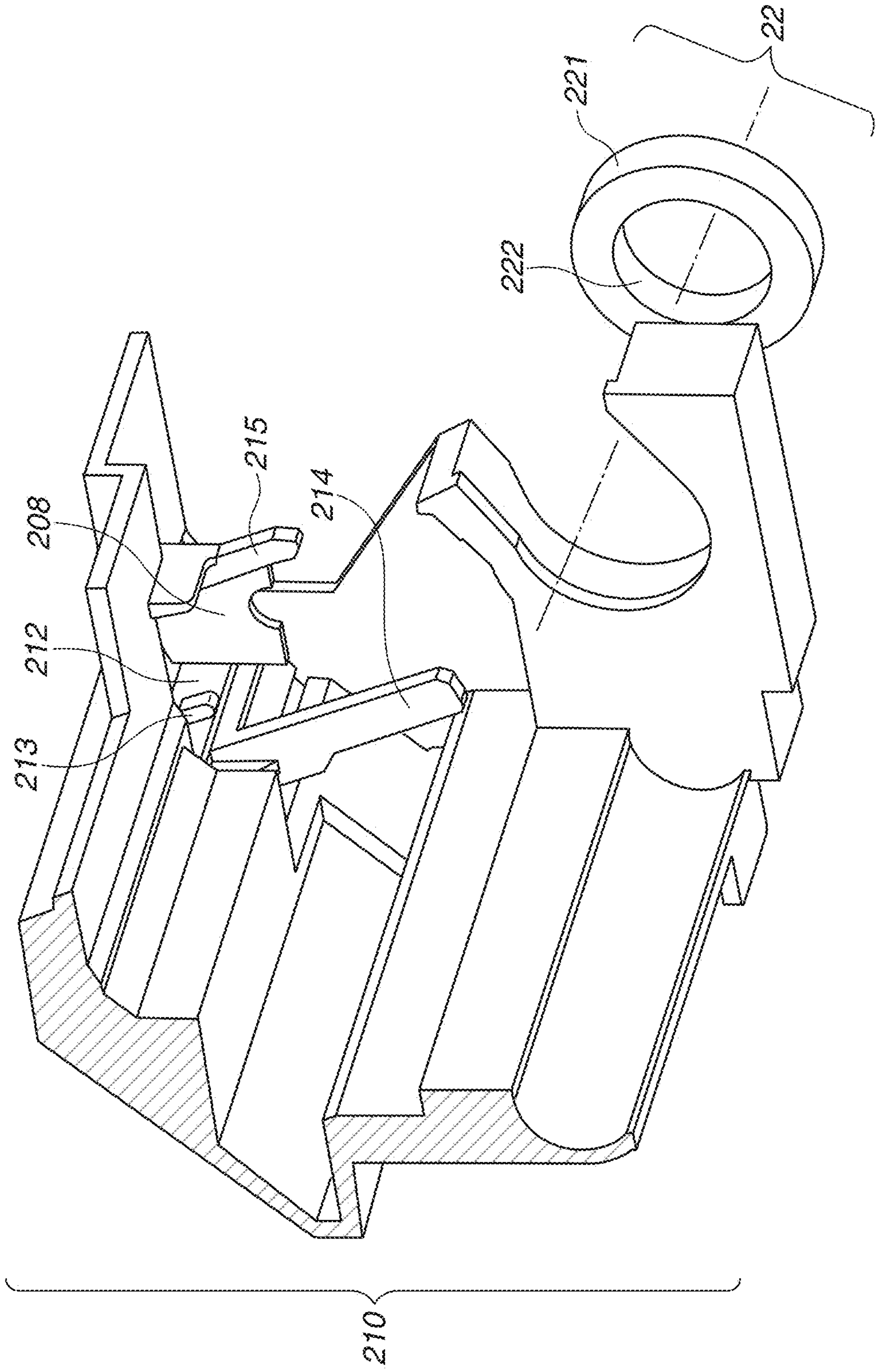
FIG. 7 is a cross-section diagram providing an exploded perspective view of a drum container and a drum shaft bearing according to a second exemplary embodiment.
Figure 8:
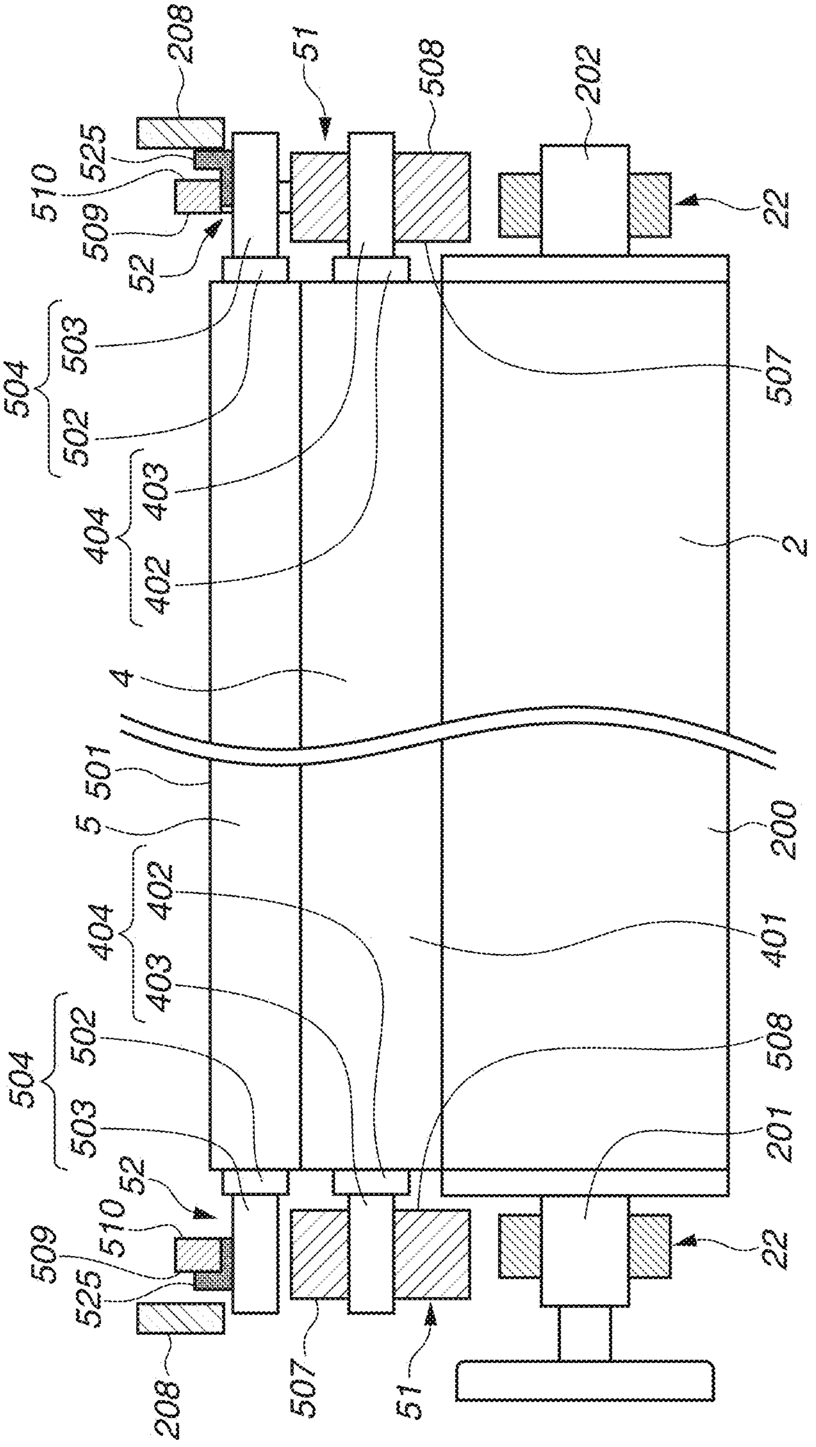
FIG. 8 is a cross-section diagram illustrating a configuration of a drum cartridge in the lengthwise direction according to the second exemplary embodiment.

As illustrated in FIG. 7, a drum container 210 is made of a resin material, and provided with the C-shape holes 211 on respective ends of the drum container 210 in the lengthwise direction. Inside the drum container 210, the first guide portion 214 and the second guide portion 215 arranged to face the first guide portion 214 for each of the C-shape holes 211 in the lengthwise direction are provided. The first contact surface 212 and the first protruding portion 213 are arranged between the first guide portion 214 and the second guide portion 215, and a sixth guide portion 208 is arranged between the first contact surface 212 and the C-shape hole 211.

The drum shaft bearing 22 has the outer periphery portion 221 and the inner periphery portion 222.

As illustrated in FIG. 8, the photosensitive drum 2 is formed of the cylindrical portion 200 made of an aluminum material, and the drive-side flange 201 and the non-drive-side flange 202 provided on respective ends of the cylindrical portion 200.

The charging roller 4 is formed of the rubber portion 401 made of a conductive material, and the first core metal portion 404. The first core metal portion 404 has two diameter portions, i.e., the first large-diameter portion 402, and the first small-diameter portion 403 that is smaller than the first large-diameter portion 402 in diameter.

The cleaning roller 5 is formed of the sponge portion 501 made of a sponge material such as urethane, and the second core metal portion 504. The second core metal portion 504 has the second large-diameter portion 502, and the second small-diameter portion 503 that is smaller than the second large-diameter portion 502 in diameter.

The charging roller bearings 51 are made of a resin material, and provided on respective ends of a drive side and a non-drive side of the drum container 210 in the lengthwise direction. The charging roller bearings 51 are respectively provided with the cleaning roller bearings 52.

Regarding the lengthwise direction of the charging roller 4, the first large-diameter portions 402 of the charging roller 4 are respectively regulated by the first side surface portion 507 of the charging roller bearing 51 arranged on the non-drive side of the drum container 210, and the second side surface portion 508 of the charging roller bearing 51 arranged on the drive side of the drum container 210, which are arranged on respective ends of the drum container 210.

The second large-diameter portion 502 of the cleaning roller 5 is arranged on each end of the drum container 210. The position of the cleaning roller 5 in the lengthwise direction is regulated by the first side surface portion 507 of the charging roller bearing 51 arranged on the non-drive side, and the second side surface portion 508 of the charging roller bearing 51 arranged on the drive side.

The third guide portions 525 of the cleaning roller bearings 52 are arranged respectively between the fourth side surface portion 510 of the charging roller bearing 51 arranged on the non-drive side and the sixth guide portion 208 of the drum container 210, and between the third side surface portion 509 of the charging roller bearing 51 arranged on the drive side and the sixth guide portion 208 of the drum container 210.

In this way, the positions of the cleaning roller bearings 52 in the lengthwise direction are regulated.

The third protruding portion 520 of the charging roller bearing 51 is inserted in the inner periphery portion of the cleaning roller urging member 54, and the fourth protruding portion 524 of the cleaning roller bearing 52 is inserted in the inner periphery portion of the cleaning roller urging member 54.

The present disclosure is not limited to the above-described exemplary embodiments, and the modifications including organic combinations of the exemplary embodiments are possible based on the gist of the present disclosure, and those modifications are not to be excluded from the range of the present disclosure.

In the exemplary embodiments described above, as illustrated in FIG. 1, the image forming apparatus 1 primarily transfers the toner images borne on the respective photosensitive drums 2 (2*a*, 2*b*, 2*c*, and 2*d*) onto the intermediate transfer belt 32. Then, the image forming apparatus 1 brings the transferred medium P into contact with the intermediate transfer belt 32 to secondarily transfer the toner images borne on the intermediate transfer belt 32 onto the transferred medium P. In the exemplary embodiments described above, the image forming apparatus 1 having such a configuration is described as an example, but the present disclosure is not limited to the example. The present disclosure can be applied to an image forming apparatus having a configuration in which the image forming apparatus brings the transferred medium P directly into contact with the photosensitive drums 2 (2*a*, 2*b*, 2*c*, and 2*d*) to directly transfer the toner images borne on the respective photosensitive drums 2 (2*a*, 2*b*, 2*c*, and 2*d*) onto the transferred medium P.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A drum cartridge attachable to and detachable from an image forming apparatus, the drum cartridge comprising:

a casing;

a rotatable photosensitive drum; a drum bearing attached to the casing, the drum bearing being provided on an end of the photosensitive drum in a rotation shaft axis direction to support a rotation shaft of the photosensitive drum;

a charging roller configured to contact a surface of the photosensitive drum, and charge the photosensitive drum;

a charging roller bearing attached to the casing, the charging roller bearing being provided on an end of the charging roller in a rotation shaft axis direction to support a rotation shaft of the charging roller;

a charging roller urging member configured to be compressed in a radial direction, of the photosensitive drum, and one end of which contacts the casing and another end of which contacts the charging roller bearing;

a cleaning roller configured to contact a surface of the charging roller, and clean the charging roller;

a cleaning roller bearing provided on an end of the cleaning roller in a rotation shaft axis direction to support a rotation shaft of the cleaning roller; and a cleaning roller urging member configured to be compressed in a radial direction of the charging roller, and one end of which contacts the charging roller bearing and another end of which contacts the cleaning roller bearing, wherein the charging roller bearing includes a first regulation portion configured to regulate the cleaning roller bearing in a circumferential direction of the charging roller, and a second regulation portion configured to regulate the cleaning roller bearing in a rotation shaft axis direction of the charging roller, wherein the cleaning roller includes a third regulation portion configured to regulate the cleaning roller bearing in a rotation shaft axis direction of the cleaning roller, wherein the cleaning roller is regulated in a circumferential direction by the charging roller bearing, and wherein the cleaning roller bearing is regulated in the rotation shaft axis direction of the cleaning roller by the cleaning roller and the charging roller bearing.

2. The drum cartridge according to claim 1, wherein the first regulation portion is a guide portion of the charging roller bearing, configured to engage with a guide groove of the cleaning roller bearing, and wherein the second regulation portion is a side surface portion of the charging roller bearing.

3. The drum cartridge according to claim 1, wherein the cleaning roller includes a sponge portion and a core metal portion with a first diameter portion and a second diameter portion that is smaller than the first diameter portion in diameter, and wherein the third regulation portion is the first diameter portion.

4. A drum cartridge attachable to and detachable from an image forming apparatus, the drum cartridge comprising:

a casing;

a rotatable photosensitive drum;

a drum bearing attached to the casing, the drum bearing being provided on an end of the photosensitive drum in a rotation shaft axis direction to support a rotation shaft of the photosensitive drum;

a charging roller configured to contact a surface of the photosensitive drum, and charge the photosensitive drum;

a charging roller bearing attached to the casing, the charging roller bearing being provided on an end of the charging roller in a rotation shaft axis direction to support a rotation shaft of the charging roller;

a charging roller urging member configured to be compressed in a radial direction of the photosensitive drum, and one end of which contacts the casing and another end of which contacts the charging roller bearing;

a cleaning roller configured to contact a surface of the charging roller, and clean the charging roller;

a cleaning roller bearing provided on an end of the cleaning roller in a rotation shaft axis direction to support a rotation shaft of the cleaning roller; and a cleaning roller urging member configured to be compressed in a radial direction of the charging roller, and one end of which contacts the charging roller bearing and another end of which contacts the cleaning roller bearing, wherein the charging roller bearing includes a first regulation portion configured to regulate the cleaning roller bearing in a circumferential direction of the charging roller, and a second regulation portion configured to regulate the cleaning roller bearing in a rotation shaft axis direction of the charging roller, wherein the casing includes a third regulation portion configured to regulate the cleaning roller bearing in the rotation shaft axis direction of the cleaning roller, wherein the cleaning roller is regulated in a circumferential direction by the charging roller bearing, and wherein the cleaning roller bearing is regulated in the rotation shaft axis direction of the cleaning roller by the casing and the charging roller bearing.

5. The drum cartridge according to claim 4, wherein the first regulation portion is a guide portion of the charging roller bearing, configured to engage with a guide groove of the cleaning roller bearing, and wherein the second regulation portion is a side surface portion of the charging roller bearing.

6. The drum cartridge according to claim 4, wherein the third regulation portion is a guide portion of the casing.

* * * * *